United States Patent
Chou et al.

(10) Patent No.: US 11,789,820 B2
(45) Date of Patent: Oct. 17, 2023

(54) METHODS AND SYSTEMS FOR PREVENTING HANGUP IN A POST ROUTINE FROM FAULTY BIOS SETTINGS

(71) Applicant: Quanta Computer Inc., Taoyuan (TW)

(72) Inventors: Yung-Fong Chou, Taoyuan (TW);
Kuo-Chun Liao, Taoyuan (TW);
Zhen-An Hung, Taoyuan (TW);
Mei-Chen Wang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 273 days.

(21) Appl. No.: 17/180,402

(22) Filed: Feb. 19, 2021

(65) Prior Publication Data
US 2022/0269565 A1    Aug. 25, 2022

(51) Int. Cl.
| | |
|---|---|
| G06F 11/00 | (2006.01) |
| G06F 11/14 | (2006.01) |
| G06F 13/42 | (2006.01) |
| G06F 16/245 | (2019.01) |
| G06F 9/4401 | (2018.01) |
| G06F 13/16 | (2006.01) |

(52) U.S. Cl.
CPC ........ *G06F 11/1417* (2013.01); *G06F 9/4403* (2013.01); *G06F 13/1668* (2013.01); *G06F 13/4282* (2013.01); *G06F 16/245* (2019.01); *G06F 2213/0026* (2013.01)

(58) Field of Classification Search
CPC . G06F 11/1417; G06F 11/0757; G06F 9/4411
See application file for complete search history.

(56) References Cited

U.S. PATENT DOCUMENTS

| | | | | |
|---|---|---|---|---|
| 2008/0288810 | A1* | 11/2008 | Bailey | G06F 11/1417 714/E11.134 |
| 2010/0146252 | A1* | 6/2010 | Chang | G06F 1/24 713/1 |
| 2014/0040506 | A1* | 2/2014 | Frachtenberg | H04L 69/12 709/250 |
| 2017/0123923 | A1* | 5/2017 | Chang | G06F 11/1417 |
| 2022/0269565 | A1* | 8/2022 | Chou | G06F 11/2284 |

* cited by examiner

*Primary Examiner* — Philip Guyton
(74) *Attorney, Agent, or Firm* — NIXON PEABODY LLP

(57) ABSTRACT

A system and method for preventing a hang up after initiation of a watch dog time out in a computer system. A start-up routine is run via a basic input output system (BIOS). The routine applies settings for hardware components. It is determined if a watch dog timer triggered a restart from timing out when the start-up routine ran previously. The system checks a database storing settings for each of the plurality of hardware components for a proper setting for the hardware components if the watch dog timer triggered the restart. The system applies the settings from the database for the hardware components to avoid another hang up.

20 Claims, 3 Drawing Sheets

METHODS AND SYSTEMS FOR PREVENTING HANGUP IN A POST ROUTINE FROM FAULTY BIOS SETTINGS

TECHNICAL FIELD

The present disclosure relates generally to operating reliability in computing devices. More particularly, aspects of this disclosure relate to a system that prevents a system hang-up during a POST routine due to a faulty BIOS setting.

BACKGROUND

Servers are employed in large numbers for high demand applications, such as network based systems or data centers. The emergence of cloud computing applications has increased the demand for data centers. Data centers have numerous servers that store data and run applications accessed by remotely-connected, computer device users. A typical data center has physical rack structures with attendant power and communication connections. Each rack may hold multiple computing servers and storage servers. Each server generally includes hardware components such as processors, memory devices, network interface cards, power supplies, and other specialized hardware. Each of the servers generally includes a baseboard management controller (BMC) that manages the operation of the server, as well as communicates operational data to a central management station that manages the servers of the rack.

A typical server has a processing unit that may have multiple cores for computing operations. The cores are run by an operating system to communicate with other hardware components in the server. One of the functions of the operating system is to determine errors that indicate a malfunction of a hardware component during start-up. The operating system is started up through a basic input output system (BIOS). A BIOS may be typically provided as a hardware chip that is installed on the motherboard of the server. A BIOS runs a power-on self-test (POST) routine that checks the status of hardware components of the server while powering up the system. To prevent the system from freezing perpetually, a watch dog timer may be included as part of the BIOS. The watch dog timer counts down, and will restart the BIOS if the watch dog timer is not reset periodically. When the watch dog timer is reset, this indicates the start-up has been successful and the system is operating.

During the power-on self-test (POST) routine, the BIOS will reference settings stored in firmware to initialize the hardware components of the computer system. If an inappropriate BIOS setting is used to initialize any of the hardware components of the computer system, the computer system may hang up in the BIOS POST routine, and cannot power on successfully. For example, a BIOS setting for a peripheral component interconnect express (PCIe) card may be memory mapping for the card and a base address register. Current BIOS chips do not provide any method to prevent system hang up when the BIOS uses inappropriate settings. For example, if the BIOS PCIe memory resource is not arranged properly, the BIOS will hang up. When the BIOS POST exceeds the time for the watch-dog timer, the watch dog timer will restart the system. Thus, when the system then continues, a watch-dog timeout is provided and the BIOS saves the data related to the incorrect setting in a system error log stored in the BMC. The BIOS does not try to power on the system and the incorrect setting must be identified and correct settings must be applied before the system powers up successfully.

For example, a computer system may have a PCIe expansion card with a graphic processing unit (GPU). Thus, during the boot-up, the BIOS needs to set the proper memory mapped input/output (MMIO) size and a base address register setting for the PCIe expansion card. In the case of the GPU, the GPU needs the proper MMIO for storing its firmware and initializing the GPU expansion card. If the BIOS fails to provide the proper MMIO size and base address register, the system will be hung in the BIOS POST routine. Another example may be when a feature of the expansion card need more memory than is available in the MMIO size thereby causing the hang up.

In this case, once a hang up occurs, the user may unplug the GPU expansion card and try to find the root cause for the system hang up by inputting the correct settings for the GPU expansion card. When the computing system only has a single expansion card, it is not complicated for a user to find the correct BIOS setting for the single expansion card. However, current server designs have multiple expansion cards as well as other devices such as specialized processors, Non-Volatile memory Express (NVMe) devices, and redundant array of inexpensive disks (RAID) devices. Thus, typically, it is very difficult for the user to find out the appropriate BIOS settings for the particular faulty device because there may be settings for the multiple devices, any of which may have improper settings.

Thus, there is a need for a mechanism that allows a start-up routine to use the proper BIOS settings for attached devices when an initial boot causes a watch dog timeout to prevent system hang up. There is a further need for the designation of a system routine that allows checking the system configuration and disabling devices without a correct configuration to prevent system hang up. There is a further need for a system that includes a database to store prior configuration setting to allows the determination of a proper configuration after the system hangs up in POST.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter; nor is it intended to be used in isolation to determine the scope of the claimed subject matter. The subject matter should be understood by reference to appropriate portions of the entire specification of this disclosure, any or all drawings and each claim.

One disclosed example is a system to allow a system boot after a hang up from improper hardware settings. The system includes a basic input output system (BIOS) running a start-up routine that applies settings for hardware components. The system includes a plurality of hardware components, each requiring proper settings applied by the BIOS to function. A database stores settings for each of the hardware components. A watch dog timer triggers a restart on timing out during the start-up routine. During the restart, the start-up routine accesses the database for the proper settings for at least one of the hardware components when the restart is triggered by the watch dog timer.

A further implementation of the example system is an embodiment where the database is stored on a memory device accessible to the BIOS. Another implementation is where the computing device is a server. Another implementation is where the BIOS disables the at least one hardware component if a proper setting is not found in the database. Another implementation is where the BIOS triggers an alert indicating that the settings have been changed for the plurality of hardware components. Another implementation is where the hardware components are PCIe devices. Another implementation is where the settings include a memory mapped input/output (MMIO) size and a base address register. Another implementation is where the database includes configuration files including the configuration settings for each of the hardware components and BIOS settings. Another implementation is where a new configuration file is created when the settings are changed. The routine checks the most recent configuration file first when accessing the database.

Another disclosed example is a method of preventing a hang up after initiation of a watch dog time out in a computer system. A start-up routine is run via a basic input output system (BIOS). The routine applies settings for a plurality of hardware components. It is determined if a watch dog timer triggered a restart from timing out when the start-up routine ran previously. A database storing settings for each of the plurality of hardware components is checked for a proper setting for at least one of the hardware components if the watch dog timer triggered the restart. The settings from the database are applied for the hardware component.

Another implementation of the example method is where the database is stored on a memory device accessible to the BIOS. Another implementation is where the computer system is a server. Another implementation is where the method includes disabling the at least one hardware component if a proper setting is not found in the database. Another implementation is where the method includes triggering an alert indicating that the settings have been changed. Another implementation is where the hardware components are PCIe devices. Another implementation is where the settings include a proper memory mapped input/output (MMIO) size and a base address register. Another implementation is where the database includes configuration files including the settings for each of the hardware components and BIOS settings. Another implementation is where the method includes creating a new configuration file when the configurations are changed. The most recent configuration file is checked first when accessing the database.

Another disclosed example is a basic input output system (BIOS) chip for a computer system. The BIOS chip includes instructions that when executed by a processor are operable to run a start-up routine applying settings for hardware components of the computer system. The instructions are operative to determine if a watch dog timer triggered a restart from timing out during running the start-up routine previously. The instructions are operative to check a database storing settings for each of the hardware components for a proper setting for at least one of the hardware components if the watch dog timer triggered the restart. The instructions are operative to apply the settings from the database for the hardware component.

BRIEF DESCRIPTION OF THE DRAWINGS

The disclosure will be better understood from the following description of exemplary embodiments together with reference to the accompanying drawings, in which.

Figure 1:
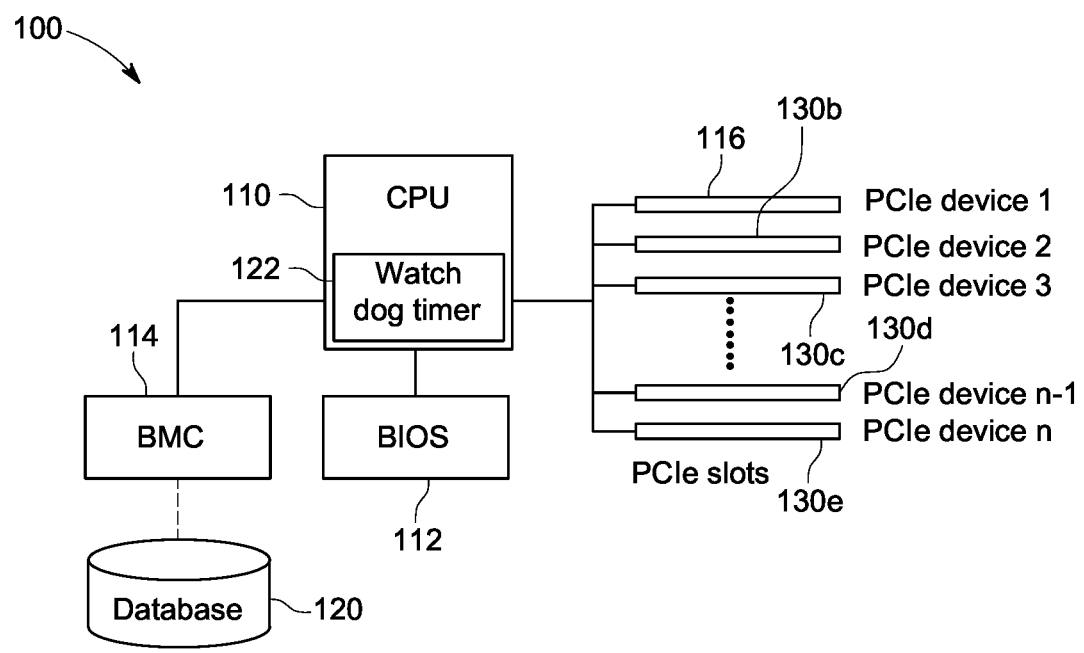
FIG. 1 is a block diagram of the components of a computer system that allow avoiding a hang up during the POST routine.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The present disclosure is directed toward a routine that determines the proper BIOS settings for hardware devices to prevent a hang up of the start-up routine in a computer system. Initially, if the system hangs up while running the POST routine, a watch dog timeout will occur and restart the system. The example routine will check the system configuration settings for hardware devices after the reboot. The example routine then provides proper BIOS settings from a database to the hardware devices to prevent system hang up after the reboot.

This database is stored in the BIOS accessible memory and stores device settings such as "platform PCIe configurations" and "BIOS settings." The database provides the basis for the recovery method on a subsequent start up after a watch dog timeout. The start-up routine accesses the database to provide the proper settings to avoid hang up from using incorrect BIOS settings for hardware devices such as a PCIe card on the system.

FIG. 1 is a block diagram of the components of a computer system 100 that runs a routine to prevent hang up after a watch dog timer flag has been set by the watch dog timer triggered from a previous hang up. When restarting after the watch dog time out, the computer system 100 will either load the correct configuration setting for a hardware device from a database or deactivate that hardware device, thus allowing the computer system 100 to avoid hang up and restart in either case.

The example computer system 100 includes a central processing unit (CPU) 110, a basic input/output system (BIOS) 112, a baseboard management device (BMC) 114 and a series of expansion slots 116. In this example, the BMC 114 accesses a memory device, such as an EEPROM, that stores a database 120 with previous configuration settings. In this example the computer system 100 may be any computing device with a processor, an operating system, and hardware components requiring proper settings to function, such as a server, a storage system, a switch, a router or the like. In this example, the central processing unit 110 includes a watch dog timer 122 that restarts the operation of the computer system 100 if the watch dog timer 122 reaches a predetermined time. The watch dog timer 122 may be implemented by other controllers on the computer system 100.

The BMC 114 is coupled to a non-volatile memory such as an EEPROM that stores BMC firmware. In this example, the non-volatile memory may be flash memory, but any appropriate non-volatile memory may be used. The BIOS 112 is firmware used in a boot-up process after the computer system 100 is powered-on. In this example, the BIOS 112 may be a chip that may be accessible from a bootstrap processor core that is part of the central processing unit 110. The BIOS 112 includes routines that apply settings to the hardware components when such components are initialized as part of the boot-up process of the computer system 100. In this example, the BIOS 112 includes an initial power-on self-test (POST) routine, which may be part of BIOS UEFI procedures such as a Pre-EFI initialization environment (PEI) or a driver execution environment (DXE).

The expansion slots 116 may be Peripheral Component Interconnect Express (PCIe) expansion slots with appropriate connectors that meet the PCIe standard. In this example, different PCIe devices 130a, 130b, 130c, 130d, and 130e are inserted in the expansion slots 116. Each of the PCIe devices 130a-130e have configuration settings that must be applied by the BIOS 112 for the PCIe device to properly function. For example, the PCIe devices may include expansion cards such as NICs (Network Interface Cards), redundant array of inexpensive disks (RAID) cards, field programmable gate array (FPGA) cards, solid state drive (SSD) cards, dual in-line memory, general purpose graphic processing unit (GPU) cards, and non-volatile Memory Express (NVMe) cards.

Each different type of PCIe device has specialized settings that are required for the PCIe device to function properly. For example, in the case of a PCIe card, the BIOS 112 sets the proper memory mapped input/output (MMIO) size and a base address register setting for the PCIe expansion card. Specifically, in the case of a GPU PCIe expansion card, the GPU needs the proper MMIO for storing its firmware and initializing the GPU expansion card.

Examples of other hardware components that require proper settings may include a redundant array of inexpensive disks (RAID) devices, field programmable gate arrays (FPGA), power supply units (PSU), hard disk drives (HDD), solid state drives (SSD), dual in-line memory modules (DIMM), central processing units (CPU), and graphic processing units (GPU).

The example computer system 100 has a routine that includes a detection mechanism for a prior watch dog timeout that resulted in a BIOS POST routine hang up. If the watch dog timeout from the watch dog timer 122 occurred in the last boot attempt, the example routine will compare the current system configurations with the system configurations from the last time the computer system 100 powered on successfully. If the comparison shows that the system configurations have changed, the BIOS routine checks the database 120 to find proper "PCIe configurations" relating to the hardware component and "BIOS proper settings" relating to the BIOS in general. For example, after obtaining all of the required PCIe memory resources, the BIOS will need to arrange memory resources for each PCIe devices. If the reserved memory resource is not enough for current hardware configurations, the BIOS will reboot and try to reallocate and rearrange memory resources until memory resources are sufficient. If on the reboot, such reallocation or rearrangement fails, a hang up may occur.

If the routine finds the proper settings in the database 120, the proper BIOS settings are applied. After the system applies the proper settings and configurations from the database 120, the system can continue the POST routine without hang up. The routine then informs the user that the BIOS settings have been changed through an alert. The system will then update the database 120 with the current configuration settings of the PCIe device.

If the system does not find the proper settings in the database, the current PCIe configuration is not saved in the database 120. The system will then disable the hardware device, such as one of the PCIe devices 130a, 130b, 130c, 130d, or 130e, to prevent a hang up during the subsequent POST routine. The system will then inform the user the PCIe configurations for the hardware device have changed via an alert.

If the settings have been changed for one of the PCIe devices such as the PCIe device 130c, the POST routine will be hung up on start-up because it will not have the appropriate or proper settings for the PCIe device 130c. For example, if the user enabled some functions in the BIOS setup menu for PCIe firmware, this may cause a PCIe card to need more memory resources, thereby preventing the BIOS from properly arranging the memory resources. The BIOS will continue to reboot the system and reallocate memory resources until memory resources are sufficient for the current hardware configuration. In cases, where memory resources cannot be successfully arranged, the system will not power on successfully. When the POST routine is hung up, the watch dog timer 122 will trigger a restart. The computer system 100 will power-up again and the routine will detect that the restart was triggered by the watch dog timer 122. The routine will then search the database 120 for a previous proper configuration setting for the PCIe device 130c. If a proper configuration setting is found, the PCIe device 130c may still function and the POST routine continues. If no proper configuration setting is found in the database 120, the example routine disables the PCIe device 130c and continues the POST routine. In this manner, the computer system 100 will be powered up regardless of whether a hardware component has proper configuration settings, thus avoiding hang up.

Figure 2:
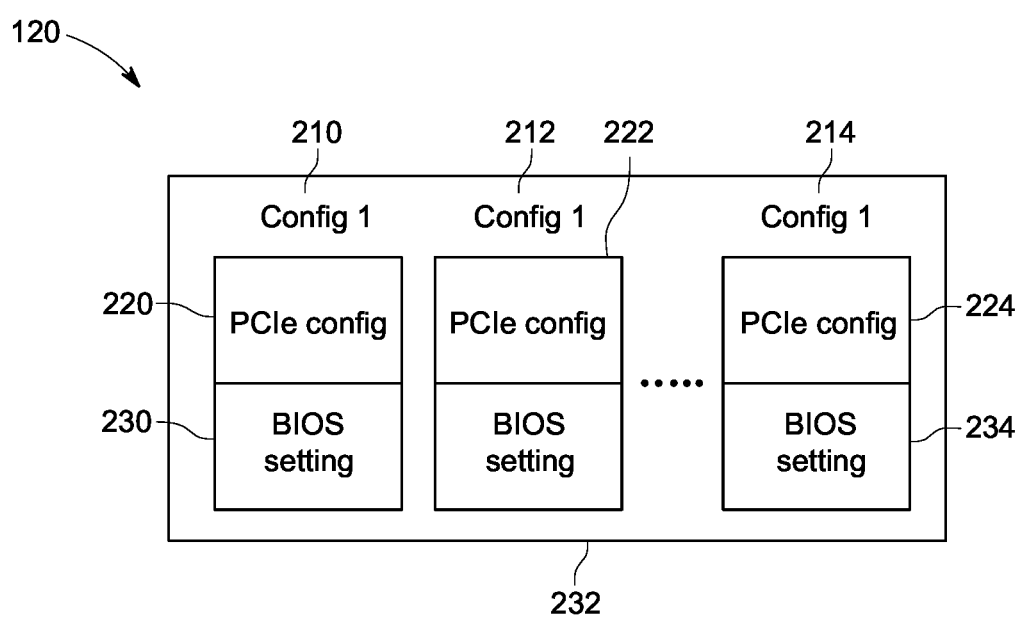
FIG. 2 is an example diagram of a database for configuration settings for the computer system in FIG. 1.

FIG. 2 shows contents of the database 120. The database 120 saves proper settings of platform configurations, such as PCIe configurations, and other relevant BIOS settings. In this example, the database 120 includes three configuration settings files 210, 212, and 214. In this example, the configuration settings file 210 includes a PCIe settings section 220 that includes the settings for each of the PCIe devices 130a-130e in FIG. 1. The configuration settings file 210 also includes a BIOS settings section 230 that includes the PCIe reserved memory resources, option ROM (OPROM) data, PCIe functions, and PCIe drivers. Similarly, the configuration settings file 212 includes a PCIe settings section 222 and a BIOS setting section 232, while the configuration settings file 214 includes a PCIe settings section 224 and a BIOS setting section 234.

As will be explained, on a successful start-up, the configuration settings for each of the hardware components of the computer system 100 are stored on the database 120 in FIG. 1 if the settings or configuration are changed. Each of the different files 210, 212, and 214 represents configurations that are saved chronologically each time the configuration settings are changed. Thus, in this example, the most recent saved configurations are in the configuration setting file 210, while the oldest saved configuration is in configuration setting file 214. The number of files stored is limited to the number allowed by the maximum size of the database 120. The database 120 can be updated by a remote server or a local system controller in cases where new settings are provided or new hardware is added to the computer system 100. As explained above, the computer system 100 checks the database 120 if the current BIOS settings are incorrect for any of the PCIe devices. The routine will begin with the newest configuration file, such as the file 210 and check for appropriate or proper settings for each stored configuration file, until a proper configuration setting is found for the PCIe device. As explained above, if a correct set of settings is not found in any of the configuration setting files 210, 212, or 214 in the database 120, the routine will disable the PCIe device or other hardware component to allow the computer system 100 to continue the start-up routine.

Figure 3:
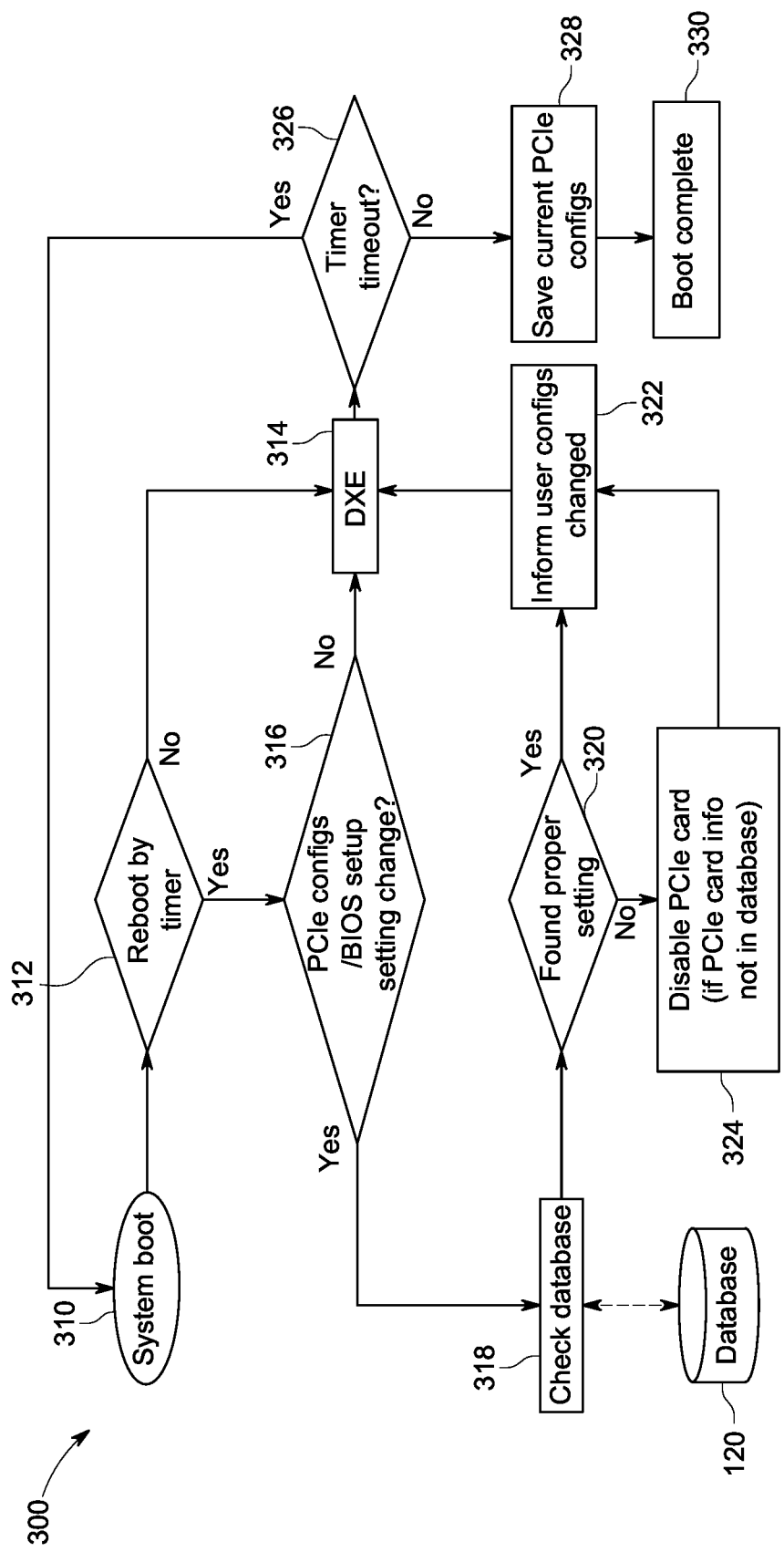
FIG. 3 is a flow diagram of a routine to ensure the configuration settings are proper to avoid a hang up after the restart.

FIG. 3 is a flow chart 300 of the example boot-up routine that prevents a system hang up in the computer system 100 in FIG. 1. The flow chart 300 in FIG. 3 is representative of example machine readable instructions. In this example, the machine readable instructions comprise an algorithm for execution by: (a) a processor; (b) a controller; and/or (c) one or more other suitable processing device(s). The algorithm may be embodied in software stored on tangible media such as flash memory, CD-ROM, floppy disk, hard drive, digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit [ASIC], a programmable logic device [PLD], a field programmable logic device [FPLD], a field programmable gate array [FPGA], discrete logic, etc.). For example, any or all of the components of the interfaces can be implemented by software, hardware, and/or firmware. Also, some or all of the machine readable instructions represented by the flowcharts may be implemented manually. Further, although the example algorithm is described with reference to the flowcharts illustrated in FIG. 3, persons of ordinary skill in the art will readily appreciate that many other methods of implementing the example machine readable instructions may alternatively be used. For example, the order of execution of the blocks may be changed, and/or some of the blocks described may be changed, eliminated, or combined.

The routine first starts the boot-up process by running the POST routine (310). The routine will check if the computer system 100 was restarted by the watch dog timer (312). If the computer system 100 was not restarted by the watch dog timer 122, the computer system 100 will initiate the system boot into the driver execution environment (DXE) phase (314). If the computer system 100 was restarted by the watch dog timer 122, indicating a possible incorrect configuration setting for one of the hardware components, the routine will determine whether the BIOS 112 is using the incorrect configuration settings for any hardware device such as a PCIe card. The routine will then determine whether the configuration settings for the devices have changed (316). The routine will then check the device configurations such as PCIe configurations and the BIOS settings such as PCIe reserved memory resources, OPROM, PCIe drivers, and PCIe functions. If the PCIe configurations and BIOS settings are not changed, the routine will continue the DXE phase of POST routine (314). This indicates the watch dog timer 122 was triggered for some other reason.

If the settings have not changed, the routine proceeds to the DXE phase (314). If the settings have changed, the routine will check the database 120 to determine whether a proper configuration setting for the hardware component allowing the hardware component to function is stored in one of the configuration files (318). The routine then determines whether the proper setting for the hardware component has been found (320). If a proper configuration setting is found in the database 120, the routine informs the user that configuration settings have changed (322). The BIOS will apply the changed configuration settings from the database. If the proper configuration settings are not found in the database, the routine disables the component (324). The routine then informs the user that the configuration settings have been changed (322). After the user is informed, the routine then boots in the DXE phase (314).

After the DXE phase (314), the routine will determine whether the watch dog timer has triggered a system hang up (326). If the watch dog timer is triggered due to a hang up (326), the routine loops back to the system boot POST routine and restarts (310). If the watch dog timer is not triggered (326) because the settings for all of the hardware components are correct, the POST routine is successful and avoids hang up. The current configuration settings are then saved to a new configuration settings file in the database 120 if the current hardware configuration or BIOS settings are changed (328). The routine will complete the POST routine and continue to complete the boot of the computer system 100 (330).

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A system for allowing a system boot after a hang up from improper hardware settings, the system comprising:
    a basic input output system (BIOS) running a start-up routine that applies settings for hardware components;
    a plurality of hardware components, each hardware component requiring proper settings applied by the BIOS to function;
    a database storing settings for each of the plurality of hardware components
    a watch dog timer triggering a restart of the system on timing out during the start-up routine when an applied setting is improper for at least one of the hardware components; wherein during the restart, the start-up routine accesses the database for the proper settings for at least one of the plurality of hardware components when the restart is triggered by the watch dog time; wherein the BIOS disables the at least one of the hardware components if a proper setting is not found in the database; and wherein the BIOS continues the restart.

2. The system of claim 1, wherein the database is stored on a memory device accessible to the BIOS.

3. The system of claim 1, wherein the system is a server.

4. The system of claim 1, wherein the BIOS triggers an alert indicating that the settings have been changed for the plurality of hardware components.

5. The system of claim 1, wherein the plurality of hardware components are PCIe devices.

6. The system of claim 5, wherein the settings include a memory mapped input/output (MMIO) size and a base address register.

7. The system of claim 1, wherein the database includes configuration files including the settings for each of the hardware components and BIOS settings.

8. The system of claim 7, wherein a new configuration file is created when the settings are changed, and wherein the routine checks the most recent configuration file first when accessing the database.

9. A method of preventing a hang up after initiation of a watch dog time out in a computer system, the method comprising:
    running a start-up routine via a basic input output system (BIOS), the routine applying settings for a plurality of hardware components;
    determining if a watch dog timer triggered a restart of the system from timing out when an applied setting was improper for at least one of the hardware components while the start-up routine ran previously;
    checking a database storing settings for each of the plurality of hardware components for a proper setting for at least one of the hardware components if the watch dog timer triggered the restart;
    applying the settings from the database for the at least one of the hardware components; and
    disabling the at least one of the hardware components if a proper setting is not found in the database; and wherein the BIOS continues the restart.

10. The method of claim 9, wherein the database is stored on a memory device accessible to the BIOS.

11. The method of claim 9, wherein the computer system is a server.

12. The method of claim 9, further comprising triggering an alert indicating that the settings have been changed.

13. The method of claim 9, wherein the plurality of hardware components are PCIe devices.

14. The method of claim 13, wherein the settings include a proper memory mapped input/output (MMIO) size and a base address register.

15. The method of claim 9, wherein the database includes configuration files including the settings for each of the hardware components and BIOS settings.

16. The method of claim 15, further comprising creating a new configuration file when the settings are changed, and wherein the most recent configuration file is checked first when accessing the database.

17. A basic input output system (BIOS) chip for a computer system, the BIOS chip comprising instructions that when executed by a processor are is operable to:
    run a start-up routine applying settings for a plurality of hardware components of the computer system;
    determine if a watch dog timer triggered a restart of the system from timing out during running the start-up routine previously when an applied setting was improper for at least one of the hardware components;
    check a database storing settings for each of the plurality of hardware components for a proper setting for at least one of the hardware components if the watch dog timer triggered the restart;
    apply the settings from the database for the at least one of the hardware components;
    disable the at least one of the hardware components if a proper setting is not found in the database; and
    continue the restart after the at least one of the hardware components is disabled.

18. The chip of claim 17, further comprising the instructions, when executed by the processor are operable to trigger an alert indicating that the settings have been changed.

19. The chip of claim 17, wherein the plurality of hardware components are PCIe devices and wherein the settings include a proper memory mapped input/output (MMIO) size and a base address register.

20. The chip of claim 17, wherein the database includes configuration files including the settings for each of the hardware components and BIOS settings and wherein the chip includes instructions that when executed by the processor are operable to create a new configuration file when the settings are changed, and wherein the most recent configuration file is checked first when accessing the database.

* * * * *